United States Patent [19]
Ginatta et al.

[11] Patent Number: 5,296,320
[45] Date of Patent: Mar. 22, 1994

[54] LEAD-ACID STORAGE BATTERY WITH TUBULAR BIPOLAR ELECTRODES

[75] Inventors: Marco V. Ginatta; Gianmichele Orsello; Pierangelo Perotti, all of Torin; Furio Rosetti, Cuorgné; Marco Zampolli, Santena; Mario Maja, Torin, all of Italy

[73] Assignees: Comitato Nazionale per la Ricerca e per lo Sviluppo dell'Energia Nucleare e delle Energie Alternative, Rome; Ginatta S.p.A., Torin, both of Italy

[21] Appl. No.: 948,608

[22] Filed: Sep. 22, 1992

Related U.S. Application Data

[63] Continuation of Ser. No. 728,155, Jul. 12, 1991, abandoned.

[30] Foreign Application Priority Data

Jul. 17, 1990 [IT] Italy ................ 48148 A/90

[51] Int. Cl.$^5$ ..................................... H01M 10/18
[52] U.S. Cl. ..................... 429/210; 429/225; 429/238; 429/160
[58] Field of Search ............. 429/210, 225, 238, 140, 429/160, 204

[56] References Cited

U.S. PATENT DOCUMENTS

| | | |
|---|---|---|
| 2,620,370 | 12/1952 | Chapman . |
| 3,553,019 | 1/1971 | Bushrod et al. ............... 429/160 |
| 3,817,788 | 6/1974 | Eckerbom et al. ............ 429/210 X |
| 3,922,175 | 11/1975 | Granquist ..................... 429/160 |
| 4,542,082 | 9/1985 | Rowlette ....................... 429/210 |
| 4,675,254 | 6/1987 | Shuster et al. ................. 429/210 X |
| 4,777,101 | 10/1988 | Blomberg et al. ............. 429/210 X |

FOREIGN PATENT DOCUMENTS

| | | |
|---|---|---|
| 1574581 | 6/1969 | France . |
| 1593297 | 7/1970 | France . |
| 2118610 | 7/1972 | France . |
| 63-65041 | 3/1988 | Japan . |
| 89/02230 | 7/1984 | PCT Int'l Appl. . |

Primary Examiner—Anthony Skapars

[57] ABSTRACT

A storage battery of the lead-acid type has unipolar electrodes (6) and bipolar electrodes (7), having a tubular shape fastened preferably perpendicularly to walls (3, 4) made of an insulating material, which divide container into two or more adjacent cells (1) containing the electrolyte. In a preferred embodiment, each tubular electrode (6, 7) is formed by an axial bar (8) of lead or an alloy thereof, having a circular section, surrounded by active material (9), either positive or negative, in its turn enclosed by a coaxial tubular sheath (10) in porous synthetic and insulating material, and end plates (11, 12) of plastic material. The exteriorly extending ends (13), of the bars (8) of the unipolar tubular electrodes (6) of each of the end cells are connected to a respective external bus bar (14) for the current. The external bus bar (14) constitutes a pole of the storage battery.

15 Claims, 5 Drawing Sheets

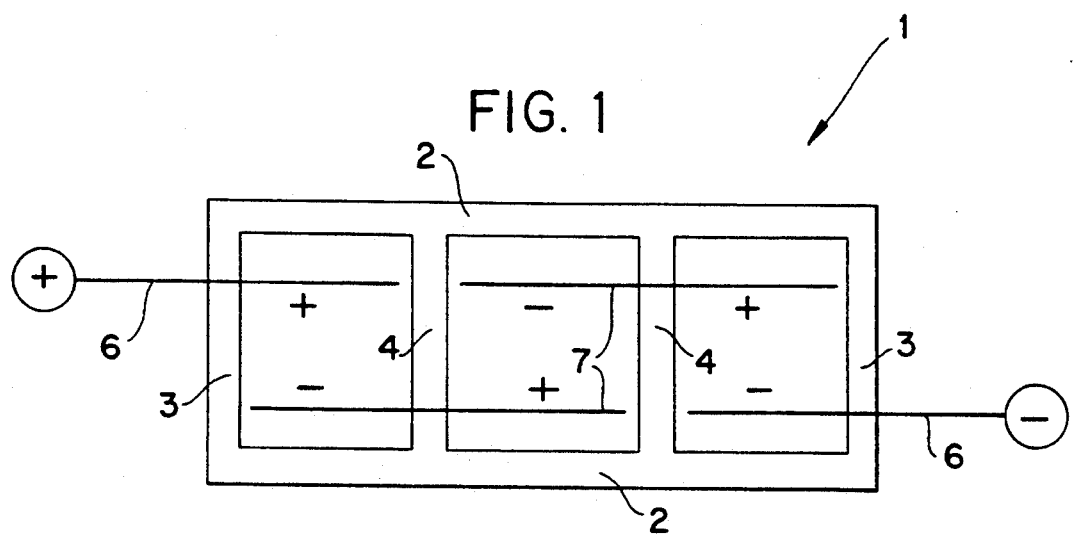
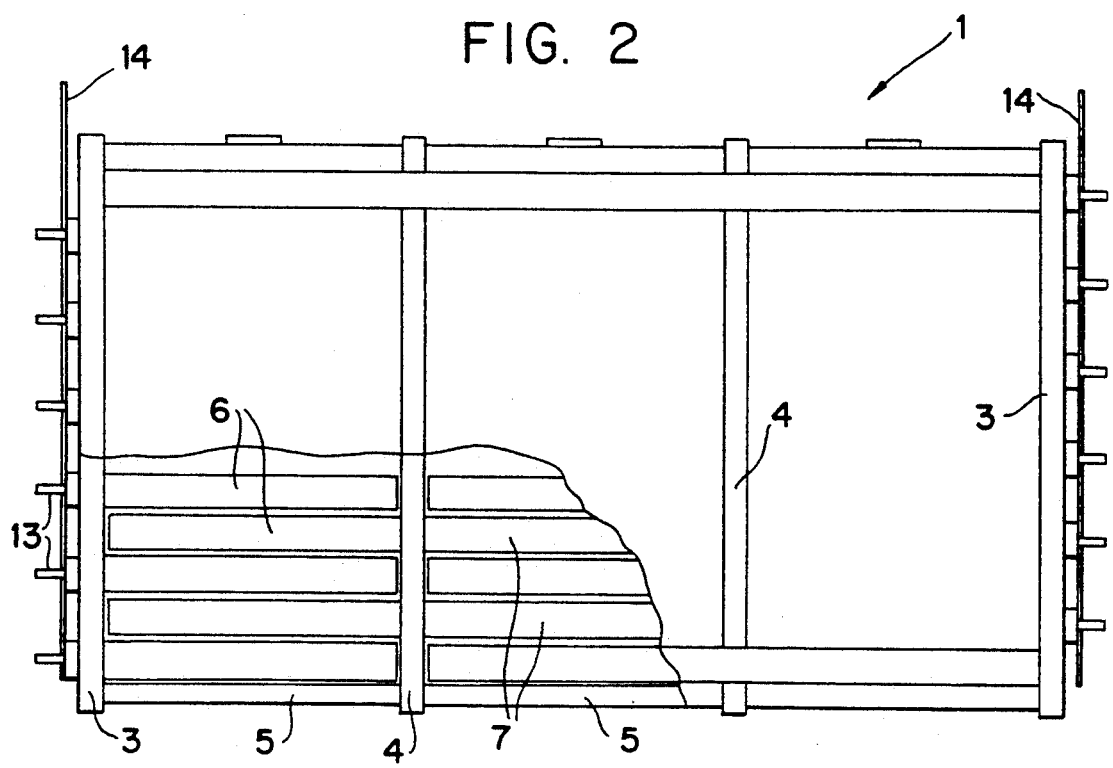

LEAD-ACID STORAGE BATTERY WITH TUBULAR BIPOLAR ELECTRODES

This application is a continuation of application Ser. No. 07/729,155 filed on Jul. 12, 1991, now abandoned.

BACKGROUND OF THE INVENTION

1. Field of the Invention

The present invention relates to a storage battery of the lead-acid kind comprising unipolar electrodes having a tubular shape, directed to increasing the specific energy (with an attendant decrease of the weight of the nonactive material) and to improving the operative features, such as the internal resistance and the prolongation of the life cycle of the device.

2. Description of the Prior Art

The invention has been developed in the field of research aimed at the improvement of the technical characteristics of lead-acid storage batteries for promoting their application (preferential) to electric propulsion. The bipolar arrangement has already been used, but with controversial results, due to technical difficulties connected to the practical embodiment of the related methods.

SUMMARY OF THE INVENTION

The storage battery according to the invention comprises a container, usually of paralellepipedal shape, of a kind with boxed assembly, made of a plastic insulating material, for instance PVC, containing the electrolyte, and divided into two or more cells by means of one or more partition walls of the same insulating material, traversed by bipolar tubular electrodes, while the transverse walls of the container, also called end walls, parallel to the partition walls, are traversed unipolar tubular electrodes connected to external bus bars for the current. Each tubular electrode is constituted of an axial bar of lead or an alloy thereof, surrounded by active material, in its turn surrounded by a coaxial tubular sheath of permeable insulating material, and by end plates made of plastic material. The tubular electrodes are fastened by means of projections on the respective bars disks of lead or an alloy thereof, to the partition walls or to the end walls. The walls are preferably formed by assembling two half walls of plastic material, one of which has a cavity for receiving the corresponding projection or disk of the electrode bar, the two half walls being glued together when they are mechanically coupled in order to ensure the hermeticity of the cells. The tubular electrodes, supported by the end walls by means of the respective bars, are arranged preferably perpendicularly to the partition walls and parallel to each other, respectively arranged as a comb.

A storage battery structure according to the invention allows the active material of the electrodes to be distributed in such a way as to minimize the ohmic losses of the internal connections and of the electrolyte, to have a uniform current distribution in the active mass, and to have an electrolyte density that varies in a uniform manner.

Finally, the advantages that derive therefrom are:
a lower internal resistance,
a more uniform distribution of the current density,
a better use of the active material,
the elimination of external and internal connections carrying current between the electrodes,
a reduction of the weight of the storage battery,
a high specific energy,
the possibility of using a manufacturing process which is in a great part a conventional one, with small modifications in the assembly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will be better understood by a detailed disclosure of a preferred embodiment of the same, shown as a non-limiting example and with reference to the attached drawings, wherein:

FIG. 1 is a general explanatory diagram in plan view of a storage battery having three cells according to the present invention;

FIG. 2 is a schematic lateral view, with cut away parts, of a storage battery realized according to the principle of FIG. 1;

DETAILED DESCRIPTION OF THE PREFERRED EMBODIMENT

Figure 3:
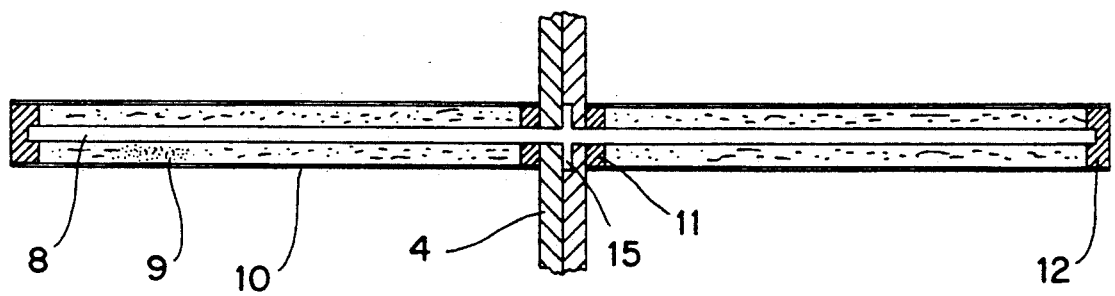
FIG. 3 is a sectional view, in an enlarged scale, of an example of a bipolar tubular electrode, to be used in the storage battery according to the invention.
Figure 4:
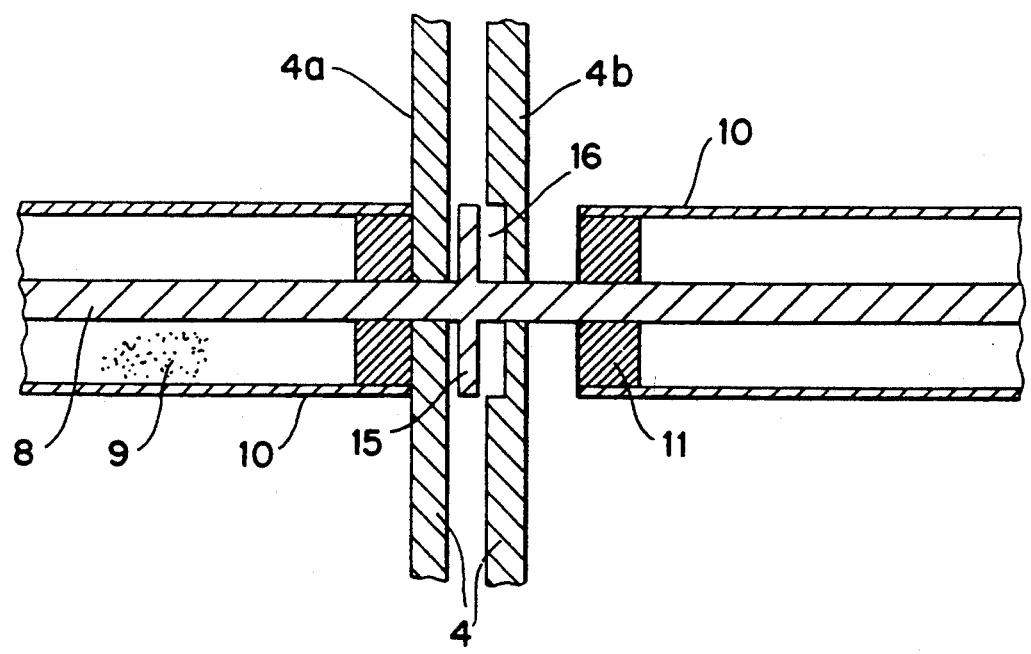
FIG. 4 is a detail with exploded parts, of the bipolar tubular electrode of FIG. 3.

With reference to FIGS. 1 to 7, an example of storage battery according to the invention comprises a container 1 made of an insulating material and having a parallelepipedal shape with a box-like assembly. Two vertical longitudinal walls 2, two transverse vertical end walls 3, partition walls 4, in this case two walls which divide the storage battery into three cells, and three plates 5 constituting the bottom of the container and inserted between the partition walls 4 and the longitudinal walls 2 are provided. In the container 1, several horizontal unipolar tubular electrodes 6 are assembled in correspondance of an end thereof, perpendicularly to the end walls 3, in order to extend to the interior of said end cells of the storage battery, and a number of horizontal bipolar tubular electrodes 7 are assembled, in register with their half length, perpendicularly to the partition walls 4 so that they extend from one side and the other into the interior of two relative cells placed side by side.

Figure 6:
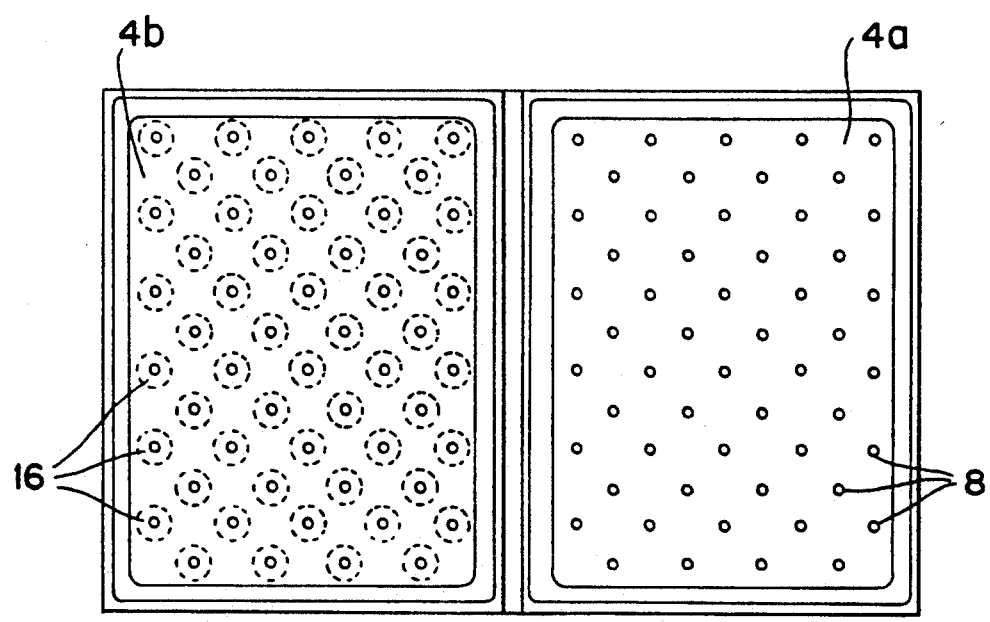
FIG. 6 shows in elevation two half walls to be coupled by means of glueing or welding in order to constitute a single partition wall.
Figure 7:
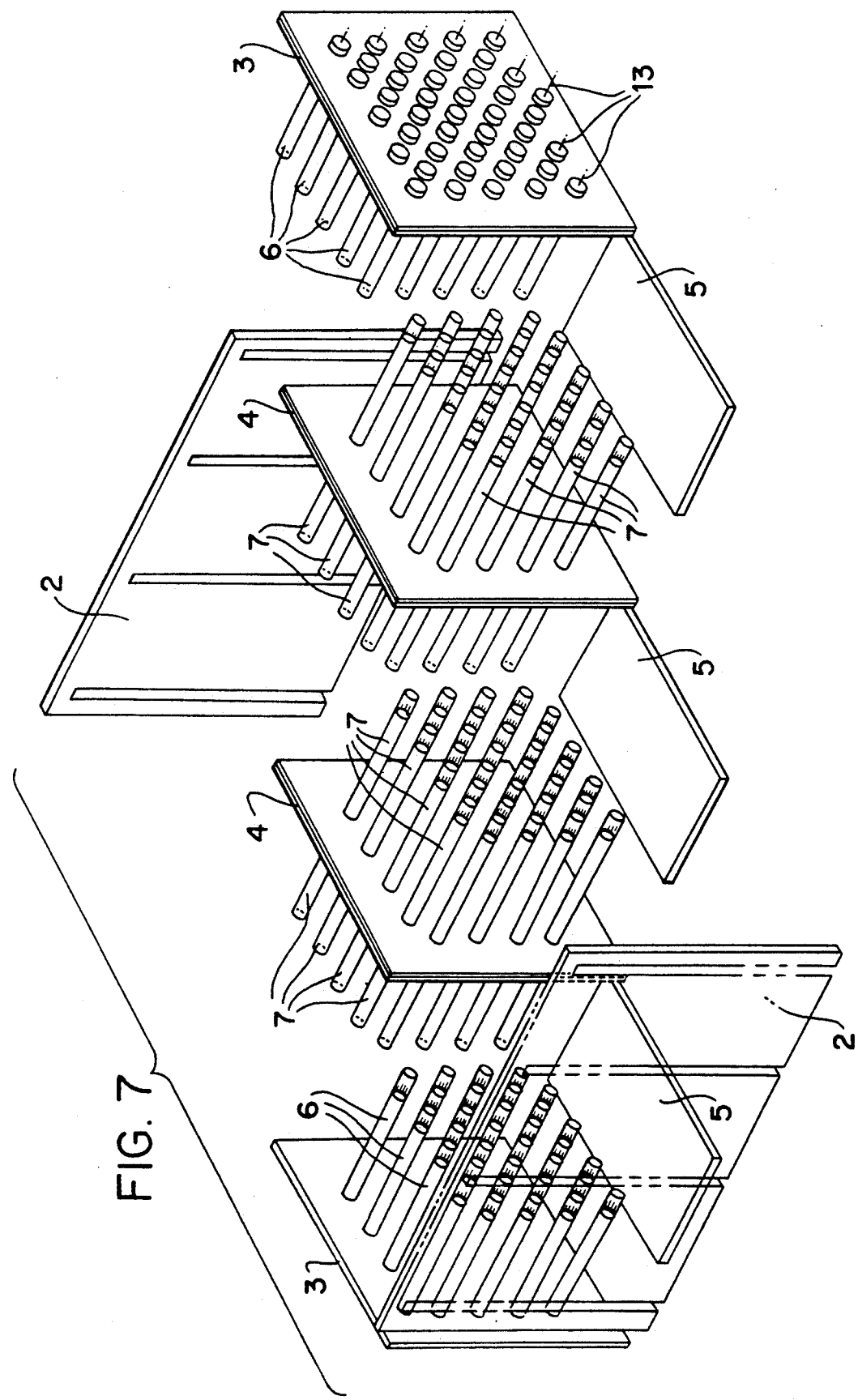
FIG. 7 is an elevation view that shows schematically the system of box-like assembly of the container constituting the storage battery, with end and partition walls and tubular electrodes shown in the preceding figures.

Both the unipolar electrodes 6 and the bipolar electrodes 7, as one may understand from FIGS. 2, 6 and 7, are parallelly supported in groups with a mesh arrangement that is reciprocally meshing, the unipolar electrodes 6 extending into the free spaces left by the bipolar electrodes 7, and the converse.

Figure 5A:
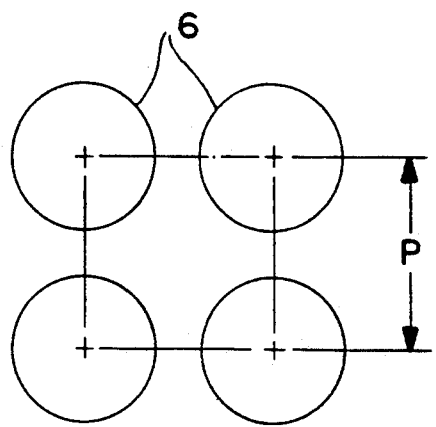
FIG. 5 (a) and 5 (b) are schematic diagrams of possible arrangements of the tubular electrodes in the storage battery of the invention.
Figure 5B:
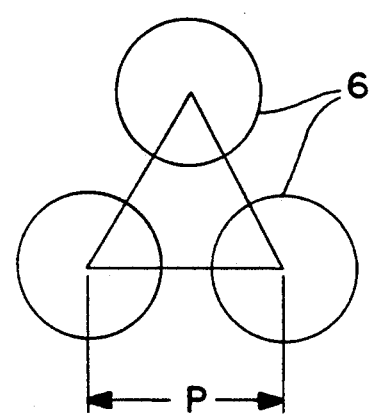

An arrangement of this kind with offset meshes may be of any type, for instance with a square mesh or a triangular mesh, as it is shown in FIGS. 5 (a) and 5 (b), with equal distances p between the axes of the electrodes of each group. While only unipolar electrodes 6 are indicated in FIGS. 5(a) and 5(b), it should be appreciated that the bipolar electrodes 7 can also be arranged in such a manner. Against a greater construction complexity, the triangular mesh arrangement offers, with respect to the arrangement with a square mesh, a more uniform distribution of the electrodes on the transversal section of each cell, and consequently better operation of the storage battery. As a matter of fact, a more uniform distribution of the electrodes also leads to a more homogeneous distribution of the layer of electrolyte around each electrode. Moreover, in this kind of arrangement, each electrode is surrounded by four electrodes for the opposite polarity, offering a greater surface for ionic exchange and thereby consequently improving the electrical behavior, in particular under a fast discharge.

Each bipolar electrode (see FIGS. 3 and 4) has an axial bar 8 carrying current, having a circular sectional shape, for instance having a diameter of about 2 mm, made of lead or an alloy thereof, preferably an alloy of the kind Pb/Sb with a low content of Sb, and refined with Se; the amount of Sb is preferably 1.7-3%. The reduction of the content of Sb limits the phenomenon of self-discharge, and the alloy that uses Sa as a refining agent shows moreover a mechanical resistance suitable for the assembly operation of the bars in the plastic material plates.

The axial bar 8 operates as a support for the electrode. Around the axial bar 8, the active material 9, positive ($PbO_2$) or negative (spongy Pb) is placed, obtained as is conventional from a slurry. The active material 9 is surrounded by a tubular sheath 10, having for instance a diameter of about 8 mm and having a thickness of about 0.3 mm. The material of the sheath 10 is of a porous plastic material (for instance a porous fiber) and is coaxial with the bar 8. Each tubular sheath 10 is closed by end plates. The end of each sheath 10 which is adjacent to an end or partition wall is closed by an end plate 11 having a central through-hole; the end of each sheath 10 which is the free end of the sheath is closed by an end plate 12 having a central recess. The plates 11 and 12 maintain the bar 8 true with respect to the tubular sheath 10.

The ends 13 of the bars 8 of the unipolar tubular electrodes 6 protrude outside the end walls 3 of the storage battery through the plates 11. The ends 13 are connected each time at the exterior with a conducting plate 14 (FIG. 2), usually made of copper, which constitutes each time the actual current bus bar or a pole of the storage battery.

The assembly of the tubular electrodes (unipolar 6 and bipolar 7) on the respective walls (end walls 3 and partition walls 4) is performed in the following way. Each bar 8 carrying current and acting as a support, has a projection, in this case a concentric disk 35 of lead or an alloy thereof, located near an end of the electrode, in the case of a unipolar electrode 6, or half way along the electrode, in the case of a bipolar electrode 7.

Each end wall 3 or partition wall 4 is realized by means of the coupling of two half walls 4a, 4b, respectively (FIGS. 4 and 6) in plastic material, such as PVC. One of these half walls of the pair has a cavity 16 for housing the concentric disk 15 of the bar 8. The two half walls of each pair are glued or welded to each other in register with their internal facing surfaces, in order to hold the disk 15 in the cavity 16. The respective adjacent end plates 11 of the tubular electrodes are also glued or welded on the respective half walls (4a and 4b in FIG. 4).

As electrolyte contained in the storage battery, in this case sulphuric acid is used, either in free form or gelled, with a specific density between 1.240 and 1.300 g/cm$^2$. In experimental operations, the modalities of electrochemical formation have been examined, i.e. the quality and quantity of the immission of acid and electric current for the transformation of Pb into $PbO_2$ (positive electrodes) and spongy Pb (negative electrodes).

Figure 8:
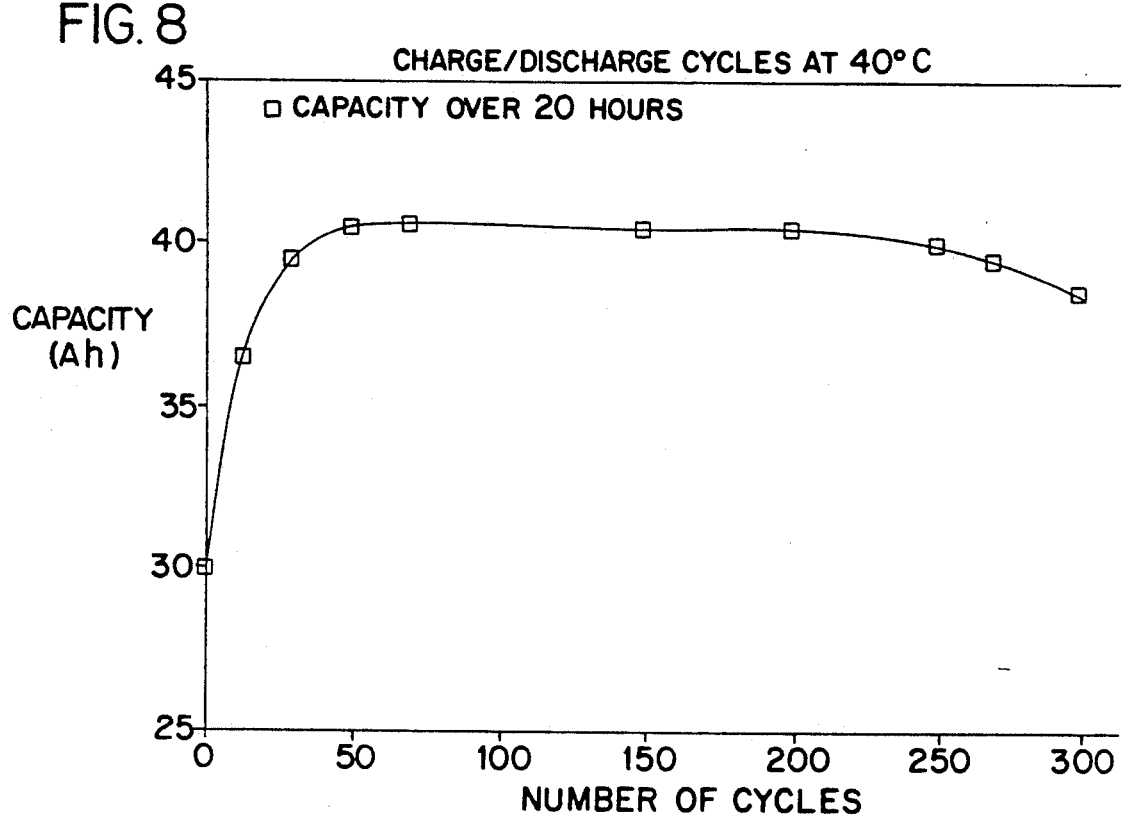
FIG. 8 is a diagram which represents the experimental capacity in function of the charge/discharge cycles at 40° C. of a storage battery according to the invention.

Electrical tests have been performed for charge and discharge, after the substitution of the formation electrolyte with the working electrolyte. These tests have been carried out under temperatures of 25° C. and 40° C. (FIG. 8). Moreover, tests of mechanical stress have been performed according to the CEI standards of 25.08.1983 (vertical vibration, 30–50 Hz, 30 m/s$^2$, for 2 hours with a rest time of 4 hours, discharge current of 180 Å, duration of the discharge 60 s, obtaining 1,33 volt/element >1,2 volt/element.

Figure 9:
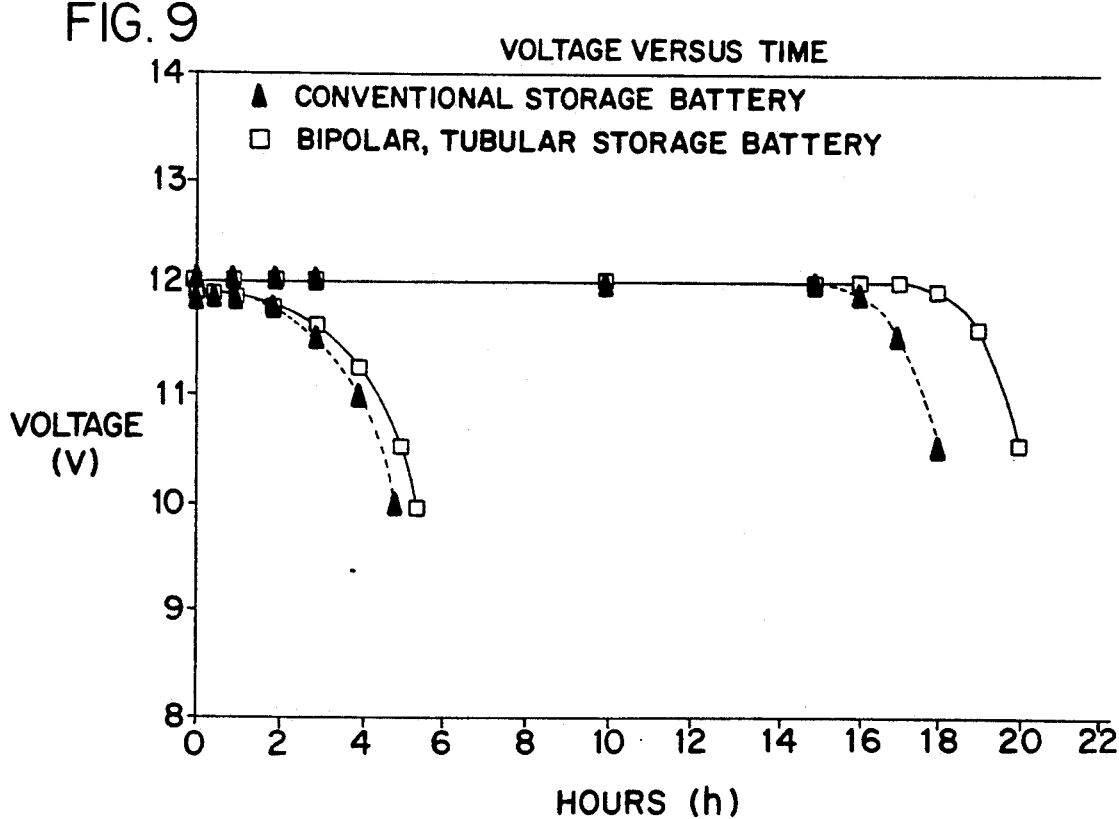
FIG. 9 is a comparison diagram of the trend of the voltage versus time in a storage battery of the lead-acid type of the prior art with respect to a similar storage battery according to the present invention.

Also a comparison has been made with a conventional storage battery having a slightly smaller size, with ten cycles of charge/slow discharge (2A) and fast discharge (6A), with the results shown by the curves I and II of FIG. 9.

From the experimental tests it has been shown that with the storage battery according to the present invention one may obtain the advantages mentioned at the beginning of the present disclosure.

It is clear that the preferred embodiment of the invention, above disclosed and shown, has been given only as a non-limiting example, and that modifications and changes in the shape of the parts and in the materials used may be considered by a person skilled in the art without departing from the scope and the spirit of the invention as hereinafter claimed.

We claim:

1. A lead-acid storage battery, comprising a container for an electrolyte, the container being divided into a plurality of cells by at least one partition wall, the at least one partition wall being an insulating material and being transversed by bars of a conducting material, the bars supporting corresponding bipolar tubular electrodes, the container further having laterally extending end walls, the end walls being traversed by other bars, the other bars supporting corresponding unipolar tubular electrodes, the bipolar tubular electrodes and unipolar tubular electrodes being parallel to each other and being reciprocably interspersed, each of the at least one partition walls and the end walls have half walls which are coupled together to form the respective at least one partition wall and the end walls, the bars and the other bars each have a projection of a same material as the respective bar and other bar, the at least one partition wall and the end walls having cavities formed therein for receiving the projections, the cavities being formed by the half walls of the at least one partition wall and the end walls and the bars and the other bars being locked to the respective at least one partition wall and the end walls by the projections being received in the cavities.

2. The storage battery according to claim 1, wherein the container has a parallelepiped shape and is made of a plastic material, the container having a box-like assembly with the end walls being traversed perpendicularly by the other bars supporting the unipolar tubular electrodes and the at least one partition wall being traversed perpendicularly by the bars supporting the bipolar tubular electrodes.

3. The storage battery according to claim 3, wherein ends of the other bars for the unipolar tubular electrodes extend through the end walls of the container and wherein the storage battery further comprises a bus collector connected to the ends of the other bars outside the container, the bus collector constitutes a relative pole of the storage battery.

4. The storage battery according to claim 2, wherein the half walls are coupled together by gluing.

5. The storage battery according to claim 4, wherein the projections each have a disk which is coaxial to the respective bar and the other bar.

6. The storage battery according to claim 5, wherein the disk is received in the cavity of one of the half walls of the at least one partition wall and the end walls.

7. The storage battery according to claim 1, wherein the bipolar tubular electrodes are constituted of said bar surrounded by active material which is surrounded by a coaxial tubular sheath and the unipolar tubular electrodes are constituted of said other bar surrounded by active material which is surrounded by a coaxial tubular sheath, the active material being one of positive and negative and the coaxial tubular sheaths being a porous synthetic material, the electrodes further having end plates of a plastic material with holes for receiving the respective bar and the other bar.

8. The storage battery according to claim 7, wherein the bars and the other bars are lead.

9. The storage battery according to claim 7, wherein the bars and the other bars are an alloy of Pb/Sb with a low content of Sb 1.7-3% and refined with Se to reduce self-discharge and for mechanical resistance during assembly of the bars and the other bars and the end walls.

10. The storage battery according to claim 7, wherein the bars and the other bars are a lead alloy.

11. The storage battery according to claim 1, wherein the electrolyte is constituted of free sulphuric acid having a specific density included between 1.240 and 1.300 $g/cm^3$.

12. The storage battery according to claim 1, wherein two partition walls are used as the at least one partition wall, each of the two partition walls being traversed by the bars.

13. The storage battery according to claim 12, wherein a bar which traverses one of the two partition walls fails to traverse the other partition wall and wherein the other bars only traverse one of the end walls and fail to extend through either of the two partition walls.

14. The storage battery according to claim 1, wherein the half walls are coupled together by welding.

15. The storage battery according to claim 1, wherein the electrolyte is constituted of gelled sulphuric acid having a specific density included between 1.240 and 1.300 $g/cm^3$.

* * * * *

UNITED STATES PATENT AND TRADEMARK OFFICE
CERTIFICATE OF CORRECTION

PATENT NO. : 5,296,320
DATED : March 22, 1994
INVENTOR(S) : Marco V. Ginatta et al.

It is certified that error appears in the above-indentified patent and that said Letters Patent is hereby corrected as shown below:

On the title page: Item

[75] Inventors:

Please change "Torin" to --Torino-- (both occurrences)

[73] Assignees:

Please change "Torin" to --Torino--

[63] Please change "728,155" to --729,155-- for the parent application Serial Number Signed and Sealed this Sixth Day of September, 1994

Attest:

BRUCE LEHMAN

*Attesting Officer*       *Commissioner of Patents and Trademarks*